2,779,797

SEPARATION OF PRIMARY AND TERTIARY CYMENE HYDROPEROXIDES

Norman A. Barthelson, Wilmington, Del., assignor to Hercules Powder Company, Wilmington, Del., a corporation of Delaware No Drawing. Application September 4, 1953,
Serial No. 378,691

11 Claims. (Cl. 260—610)

This invention relates to the separation of mixtures of hydroperoxides and more particularly to the separation of primary and tertiary cymene hydroperoxides.

In the oxidation of cymenes by elementary oxygen for the formation of hydroperoxides, both primary and tertiary hydroperoxides are formed. The hydroperoxide group is in the case of primary hydroperoxides on carbon 7 and in the case of tertiary hydroperoxides on carbon 8. The tertiary cymene hydroperoxide is an important material for conversion by acid catalyzed cleavage to cresol and for that purpose it is desirable to use a tertiary hydroperoxide free of primary hydroperoxides so as to avoid side reactions which lower the yield of cresol. Moreover, it is also desirable to recover all of the usable tertiary hydroperoxide in the oxidation mixture for economic reasons.

Now in accordance with the present invention, it has been found that primary and tertiary cymene hydroperoxides are separable from a mixture thereof by contacting the mixture with an aqueous alkali metal hydroxide solution of concentration in the range of 0.1% to 20% to form a caustic solution containing primary cymene hydroperoxide and tertiary cymene hydroperoxide in which solution the ratio of primary to tertiary is greater than in the mixture subjected to the process, contacting the caustic solution of hydroperoxides with a water-insoluble volatile organic solvent having a dielectric constant greater than three to form a solution of tertiary cymene hydroperoxide in said organic solvent from which the tertiary cymene hydroperoxide contained therein is recoverable by volatilizing the solvent. The primary cymene hydroperoxide remaining in the caustic solution is recovered by further extraction with a water-insoluble volatile organic solvent having a dielectric constant greater than three to form a solution of primary cymene hydroperoxide in the volatile organic solvent and the primary cymene hydroperoxide is recovered by volatilization of the organic solvent. The aqueous alkali metal hydroxide solution freed of primary cymene hydroperoxide is recycled in the process so that the alkali metal hydroxide is re-used. This process is clearly set forth in a flow diagram of the accompanying drawing.

The separation process of this invention is derived from the discovery of the differential distribution between a solvent and an aqueous alkali metal hydroxide solution of the primary cymene hydroperoxide and the tertiary cymene hydroperoxide. The contacting of a mixture of primary cymene hydroperoxide and tertiary cymene hydroperoxide in a water-insoluble volatile organic solvent with the aqueous alkali metal hydroxide solution forms initially a mixture of primary cymene hydroperoxide and tertiary cymene hydroperoxide in the alkali metal solution in which solution the ratio of primary cymene hydroperoxide to tertiary cymene hydroperoxide is greater than in the original mixture contacted with the alkali metal hydroxide solution. This is believed to be the initial step in a countercurrent system of extraction just as in a batch system. As a result of this differential in distribution, the primary cymene hydroperoxide is separable in a caustic fraction and the tertiary is separable in the solvent fraction. The individual hydroperoxides are then separable from their respective solutions by stripping operations. Thus the primary cymene hydroperoxide is stripped from the alkali metal hydroxide solution by means of a water-insoluble organic solvent having a dielectric constant greater than three and the tertiary cymene hydroperoxide is stripped from the solvent by distillation of the solvent or by extraction into an aqueous alkali metal hydroxide solution to separate the tertiary cymene hydroperoxide from solvent and neutral materials followed by stripping the tertiary cymene hydroperoxide from the alkali metal hydroxide solution with a water-insoluble volatile organic solvent having a dielectric constant greater than three.

One of the novel features of the present invention is the discovery that it is possible to extract a cymene hydroperoxide from an aqueous alkali metal hydroxide solution thereof by contacting the solution with a water-insoluble volatile organic solvent having a dielectric constant greater than three. While both tertiary and primary cymene hydroperoxides are extractable by aqueous alkali metal hydroxide solutions from water-insoluble solvents of dielectric constant greater than or less than three, they are extracted from such aqueous alkali metal hydroxide solutions in a practical process only by water-insoluble solvents of dielectric constant greater than three. For this reason, the water-insoluble volatile solvent of dielectric constant greater than three is required only in the step of separating the hydroperoxide from the alkali metal hydroxide solution.

The process of this invention is operable with cymene hydroperoxides made from individual or mixed o-, m- and p-cymenes and is particularly useful with m- and p-cymene hydroperoxides which are the more readily produced by oxidation with elementary oxygen. The process is useful regardless of the method of oxidation for the production of the cymene hydroperoxide or the ratio of primary to tertiary cymene hydroperoxide in the mixture and the principle may be applied to mixtures rich in either the primary or the tertiary cymene hydroperoxide. However, it is particularly useful when applied to cymene oxidation mixtures as generally produced by air oxidation of cymene wherein the tertiary cymene hydroperoxide predominates.

The process is applicable to the crude oxidation mixture containing from about 1% to about 40% total hydroperoxides but is preferably applied to mixtures of hydroperoxides containing about 10% to 20% total hydroperoxide. If desired, an oxidation mixture can be concentrated to a high total hydroperoxide content by distilling off part or all of the cymene prior to applying the process of this invention to the separation of the hydroperoxides. Concentrates containing up to 100% total hydroperoxides are operable.

The terms "primary cymene hydroperoxide" and "tertiary cymene hydroperoxide" as used in this specification and claims refer to 7-hydroperoxy cymene and 8-hydroperoxy cymene, respectively.

The following examples are specific illustrations of the process of this invention. All parts, percentages and ratios in the specification and claims are by weight except where stated otherwise.

*Example 1* p-Cymene was oxidized to 14.3% total hydroperoxide content by contacting with air at 115° C. in the presence of sufficient aqueous sodium carbonate, added from time to time, to neutralize any acids formed in the process. One hundred parts of this oxidate was then contacted with 800 parts 4.5% aqueous sodium hydroxide in a countercurrent extractor having an equivalent of seven theoretical stages. The extracted p-cymene oxidate contained 2.2 parts tertiary p-cymene hydroperoxide and was essentially free of primary p-cymene hydroperoxide. The extracted oxidate was re-used for oxidation to the hydroperoxide, the tertiary p-cymene hydroperoxide left in the oxidate being used for initiation of the second oxidation. The aqueous alkali extract was then contacted with 53 parts isopropyl ether in countercurrent extraction (five theoretical stages). The isopropyl ether on subsequent evaporation yielded 9.8 parts tertiary p-cymene hydroperoxide of 95% purity by assay. The aqueous alkali extract was then contacted with 70 parts methyl isobutyl ketone in countercurrent extraction. The methyl isobutyl ketone on subsequent evaporation yielded 2.3 parts primary p-cymene hydroperoxide of 65% purity by assay. The isopropyl ether and methyl isobutyl ketone extracted caustic was then used for countercurrent extraction of another portion of 100 parts oxidate in a repetition of the previously outlined stages.

*Example 2* p-Cymene was oxidized to 15.6% total hydroperoxide by contacting with air at 115° C. in the presence of sufficient aqueous sodium carbonate, added from time to time, to neutralize any acids formed in the process. Unreacted p-cymene was then recovered by distillation of the oxidate to a temperature of 80° C. at 25 mm. mercury pressure. The hydroperoxides were thus obtained as a concentrate analyzing 85.6% in total hydroperoxides. Twenty-five parts of this concentrate was then introduced to the center stage of an extraction column having 15 theoretical stages and was contacted with countercurrent streams of 4.5% aqueous sodium hydroxide and isopropyl ether. One hundred fifty parts isopropyl ether and 1500 parts 4.5% aqueous sodium hydroxide were used in this operation. Evaporation of the resulting isopropyl ether solution of hydroperoxide yielded 21.8 parts of tertiary p-cymene hydroperoxide in 83% purity and containing less than 1.0% primary p-cymene hydroperoxide. The alkali extract was then contacted with 100 parts methyl isobutyl ketone in a countercurrent extraction having an equivalent of six theoretical stages. The extracted alkali was then re-used for countercurrent extraction of another portion of p-cymene hydroperoxide concentrate. The methyl isobutyl ketone solution, on evaporation, yielded 3.2 parts of primary p-cymene hydroperoxide having a purity of 95.5% by assay.

*Example 3*

Substantially similar results were obtained using m-cymene in the process of Example 1.

The process of this invention is readily adapted to any of the oxidation processes in the art, for example, to the process of U. S. 2,548,435, U. S. 2,632,772, U. S. 2,547,938 and U. S. 2,619,510.

In order to avoid decomposition of the hydroperoxides, the temperature of the caustic solutions of hydroperoxides is preferably kept in the range of about 0° C. to about 35° C. and should not be permitted to rise above about 50° C.

The alkali used in the process is any of the alkali metal hydroxides, particularly sodium or potassium hydroxide. Sodium hydroxide is preferred.

The alkali being recycled in the process will gradually become neutralized by strong organic acids produced as by-products in the process and will have to be replaced eventually. The organic acids in the spent alkali solution can be recovered by treatment with mineral acids, if desired. The spent alkali can be considered spent at any stage of its falling off in efficiency due to the accumulation of organic acids. It is preferable to use the alkali up completely by using a partially spent alkali for preliminary contacting of the oxidate, and to carry out a series of extractions using alkali of increasing degrees of freshness in stepwise fashion so as to effect a countercurrent flow of materials. In this way a completely spent alkali solution is removed from the system and a less completely spent alkali is substituted therefor by being moved up in the series.

If the cymene returned to the oxidation process is not distilled, it will gradually accumulate neutral by-products such as methylacetophenone and $\alpha,\alpha$-dimethyl methylbenzyl alcohol which are produced in trace amounts.

The concentration of aqueous alkali for extracting the hydroperoxide in the process of this invention is 0.1% to 20%, and the preferred concentration is 2% to 5%.

The solvents which are useful in the process of this invention are water-insoluble volatile organic solvents which are solvents for the hydroperoxides. They should boil below about 70° C. at 20 mm. (mercury) pressure. They must be stable to caustic solutions of the strength used in the extraction and be water-insoluble. A further characteristic is that they should have a dielectric constant greater than three. By "water-insoluble" is meant having a solubility of less than 5% in water at about 30° C. The distribution of the hydroperoxide between the aqueous alkali metal hydroxide solution and the organic solvent is considered in determining what particular solvent is selected.

Satisfactory solvents include chlorinated hydrocarbons such as methylene chloride, chloroform, and ethylene chloride; ethers such as diethyl ether, diisopropyl ether, and mixed ethers such as ethyl isopropyl ether; ketones such as methyl propyl ketone, methyl isopropyl ketone, methyl isobutyl ketone, and cyclohexanone; and alcohols such as butanols and pentanols.

The extraction temperature may be anywhere in the range from about the freezing point of the alkali solution to about 50° C. The temperature must be below the boiling point of the solvent at the pressure used in order to maintain it in the liquid state and, if necessary, the extraction is carried out at elevated pressure. The temperature is preferably kept below about 30° C.

The process of this invention is desirably carried out in countercurrent extraction equipment in which the mixture of primary and tertiary cymene hydroperoxide is fed to the center, the alkali metal hydroxide solution is fed to the top and the water-insoluble volatile organic solvent is fed in at the bottom. At the top of the column, a mixture of tertiary cymene hydroperoxide and neutral components of the initial mixture fed to the column such as cymene, methylacetophenone, etc., may be removed as a solution in the volatile organic solvent. Such a mixture is satisfactory for cleavage to cresols after volatilization of the volatile organic solvent. At the bottom of the column an alkali metal hydroxide solution of primary cymene hydroperoxide is removed.

If it is desired to further purify the tertiary cymene hydroperoxide by separating it from the neutral by-products, the solution thereof may be fed into the center stage of a second extractor having alkali metal hydroxide solution fed into the top and water-insoluble organic solvent fed into the bottom. This second extractor may be directly connected to the first extractor or it may be separate. In this second extractor the alkali metal hydroxide solution of tertiary cymene hydroperoxide is separated at the bottom and it is extracted with fresh water-insoluble organic solvent having a dielectric constant greater than three countercurrently to remove the volatile solvent containing pure tertiary cymene hydroperoxide dissolved therein at the top and revivified alkali metal hydroxide solution for recycling at the bottom. The tertiary cymene hydroperoxide is recovered by volatilizing the water-insoluble organic solvent therefrom.

When it is desired to recover the primary cymene hydroperoxide, the alkali metal hydroxide solution of primary cymene hydroperoxide separated at the bottom of the first extraction is passed to another countercurrent extractor, which may be an extension of the first column or separate therefrom, where it is countercurrently extracted with a water-insoluble volatile organic solvent having a dielectric constant greater than three whereby there is separated a solution of the primary cymene hydroperoxide in the organic solvent at the top of the extraction column and revivified alkali metal hydroxide solution for re-use at the bottom of the column.

In these various extractions or extraction stages, the water-insoluble volatile organic solvent may be the same in each instance or it may be different. The extraction for the complete removal of the hydroperoxide from the alkali metal hydroxide solution thereof for recovery of revivified alkali metal hydroxide solution for re-use is preferably carried out in a separate and distinct extractor. It is convenient to use one of the more effective solvents such as methyl isobutyl ketone for this stripping type of extraction.

Thus it is seen that in the first extraction primary cymene hydroperoxide and tertiary cymene hydroperoxide are separated from each other. In a second extraction tertiary cymene hydroperoxide is separated from neutral by-products; and the primary cymene hydroperoxide is stripped from the alkali metal hydroxide solution thereof removed from the first extraction step while the tertiary cymene hydroperoxide is stripped from the alkali metal hydroxide solution thereof removed from the second extraction step.

In carrying out the process of this invention, it is desirable to carry out the extractions without delay since hydroperoxides gradually decompose and this decomposition is accelerated by elevated temperature, acids, and strong alkalies. This is particularly true for the primary cymene hydroperoxides. While the time element is not critical, the following figures on rate of decomposition at 30° C. give some indication of the effect of caustic concentration on the rate of decomposition of a mixture of primary and tertiary cymene hydroperoxides in which the primary cymene hydroperoxide contributes most to the high rate of decomposition.

| Sodium Hydroxide Concentration, Percent | Temperature, ° C. | Hydroperoxide Decomposed, Percent Per Hour |
|---|---|---|
| 20 | 30 | 6.0 |
| 10 | 30 | 2.6 |
| 5 | 30 | 1.7 |

To the end that the extraction processes are carried out with minimum time of contact with the alkali metal hydroxide solutions, it is preferable to use continuous countercurrent extraction whenever possible and not to leave the hydroperoxides in contact with the alkali metal hydroxide solutions longer than necessary for the process unless the temperature is lowered as low as possible without freezing.

What I claim and desire to protect by Letters Patent is:

1. The process of separating primary and tertiary cymene hydroperoxides from a mixture thereof which comprises contacting the mixture with an aqueous alkali metal hydroxide solution of concentration in the range of 0.1% to 20% to form a caustic solution containing primary cymene hydroperoxide and tertiary cymene hydroperoxide in which solution the ratio of primary to tertiary is greater than in the mixture subjected to the process, contacting the caustic solution of hydroperoxides with a water insoluble volatile organic solvent having a dielectric constant greater than three selected from the group consisting of methylene chloride, chloroform, ethylene chloride, diethyl ether, diisopropyl ether, ethyl isopropyl ether, methyl propyl ketone, methyl isobutyl ketone, methyl isopropyl ketone, cyclohexanone, butanols and pentanols to form a solution of tertiary cymene hydroperoxide in said organic solvent and volatilizing said organic solvent to recover said tertiary cymene hydroperoxide.

2. The process of claim 1 in which the alkali metal hydroxide is sodium hydroxide.

3. The process of claim 2 in which the concentration of the sodium hydroxide solution is in the range of 2% to 5%.

4. The process of claim 2 in which the cymene is m-cymene.

5. The process of claim 2 in which the cymene is p-cymene.

6. The process of separating primary and tertiary cymene hydroperoxides from a mixture thereof which comprises contacting the mixture with an aqueous alkali metal hydroxide solution of concentration in the range of 0.1% to 20% to form a caustic solution containing primary cymene hydroperoxide and tertiary cymene hydroperoxide in which solution the ratio of primary to tertiary is greater than in the mixture subjected to the process, contacting the caustic solution of hydroperoxides with a water insoluble volatile organic solvent having a dielectric constant greater than three selected from the group consisting of methylene chloride, chloroform, ethylene chloride, diethyl ether, diisopropyl ether, ethyl isopropyl ether, methyl propyl ketone, methyl isobutyl ketone, methyl isopropyl ketone, cyclohexanone, butanols and pentanols to form a solution of tertiary cymene hydroperoxide substantially free of primary cymene hydroperoxide in said solvent and a caustic solution of primary cymene hydroperoxide substantially free of tertiary cymene hydroperoxide, contacting said caustic solution of primary cymene hydroperoxide further with a water insoluble volatile organic solvent having a dielectric constant greater than three selected from said above named group to form a solution of primary cymene hydroperoxide in said organic solvent and a caustic solution substantially free of hydroperoxides, recycling said caustic solution to the step of contacting the mixture of hydroperoxides therewith and recovering the tertiary cymene hydroperoxide and the primary cymene hydroperoxide from their respective organic solvent solutions by volatilization of the organic solvents.

7. The process of claim 6 in which the alkali metal is sodium hydroxide.

8. The process of claim 7 in which the concentration of the sodium hydroxide is in the range of 2% to 5%.

9. The process of claim 7 in which the cymene is m-cymene.

10. The process of claim 7 in which the cymene is p-cymene.

11. In the process of purifying a tertiary cymene hydroperoxide admixed with aqueous alkali insoluble impurities by dissolving the tertiary cymene hydroperoxide in an aqueous alkali metal hydroxide solution and separating impurities insoluble in said solution, the step of recovering purified tertiary cymene hydroperoxide which comprises contacting the aqueous alkali metal hydroxide solution containing tertiary cymene hydroperoxide dissolved therein with a water insoluble volatile organic solvent having a dielectric constant greater than three selected from the group consisting of methylene chloride, chloroform, ethylene chloride, diethyl ether, diisopropyl ether, ethyl isopropyl ether, methyl propyl ketone, methyl isobutyl ketone, methyl isopropyl ketone, cyclohexanone, butanols and pentanols, separating said organic solvent containing tertiary cymene hydroperoxide dissolved therein and recovering said tertiary cymene hydroperoxide by volatilizing said organic solvent.

References Cited in the file of this patent
UNITED STATES PATENTS

| 2,548,435 | Lorand et al. | Apr. 10, 1951 |
| 2,683,751 | Filar | July 13, 1954 |

OTHER REFERENCES

Helberger et al.: Berichte, vol. 72 B (1939) 3 pgs. (1643–1645).